(12) United States Patent
McMaster

(10) Patent No.: US 8,930,813 B2
(45) Date of Patent: Jan. 6, 2015

(54) DYNAMIC TEXT ENTRY/INPUT SYSTEM

(71) Applicant: Orlando McMaster, Tampa, FL (US)

(72) Inventor: Orlando McMaster, Tampa, FL (US)

( * ) Notice: Subject to any disclaimer, the term of this patent is extended or adjusted under 35 U.S.C. 154(b) by 0 days.

(21) Appl. No.: 13/856,426

(22) Filed: Apr. 3, 2013

(65) Prior Publication Data

US 2013/0262994 A1    Oct. 3, 2013

Related U.S. Application Data

(60) Provisional application No. 61/619,536, filed on Apr. 3, 2012.

(51) Int. Cl.
| | | |
|---|---|---|
| *G06F 17/00* | (2006.01) | |
| *G06F 17/27* | (2006.01) | |
| *G06F 3/0488* | (2013.01) | |
| *G06F 17/22* | (2006.01) | |
| *G06F 3/023* | (2006.01) | |

(52) U.S. Cl.
CPC .......... *G06F 17/2264* (2013.01); *G06F 17/276* (2013.01); *G06F 3/04886* (2013.01); *G06F 3/0237* (2013.01)
USPC .......................................... 715/261; 715/256

(58) Field of Classification Search
USPC .................................. 715/256, 261
See application file for complete search history.

(56) References Cited

U.S. PATENT DOCUMENTS

| | | | | |
|---|---|---|---|---|
| 5,253,325 A | * | 10/1993 | Clark ............................ | 704/200 |
| 5,404,507 A | * | 4/1995 | Bohm et al. ........................ | 1/1 |
| 5,490,061 A | * | 2/1996 | Tolin et al. ......................... | 704/2 |
| 5,724,457 A | * | 3/1998 | Fukushima .................... | 382/311 |
| 5,774,834 A | * | 6/1998 | Visser .............................. | 704/10 |
| 6,748,316 B2 | * | 6/2004 | Takayama et al. ............. | 701/428 |
| 6,961,704 B1 | * | 11/2005 | Phillips et al. ................ | 704/268 |
| 7,475,343 B1 | * | 1/2009 | Mielenhausen ............... | 715/261 |
| 7,793,228 B2 | * | 9/2010 | Mansfield et al. ............ | 715/780 |
| 8,176,420 B2 | * | 5/2012 | Lekutai ......................... | 715/261 |
| 8,639,493 B2 | * | 1/2014 | Haug ................................ | 704/9 |
| 2007/0067298 A1 | * | 3/2007 | Stoneman ....................... | 707/10 |
| 2008/0221866 A1 | * | 9/2008 | Katragadda et al. .............. | 704/8 |
| 2010/0161316 A1 | * | 6/2010 | Haug ................................ | 704/9 |

(Continued)

OTHER PUBLICATIONS

Demasco et al., Generating Text from Compressed Imput: An Intelligent Interface for People with Severe Motor Impairments, ACM 1992, pp. 68-78.*

(Continued)

*Primary Examiner* — Cong-Lac Huynh
(74) *Attorney, Agent, or Firm* — Isidore PLLC

(57) ABSTRACT

The method, system and computer program product efficiently generates a target word by processing an input character sequence to an electronic device from a user utilizing an abbreviated word format. A dynamic text entry (DTE) logic/utility detects receipt of the input sequence that is provided by the user and, in response to receipt of the input character sequence, DTE logic determines from the input sequence whether there is a matching sequence stored in a particular DTE library accessible to DTE logic. If there is one target word that is mapped to the input sequence, DTE logic appropriately displays the target word instead of continuing to display the input sequence. However, if DTE logic determines that multiple candidate target words are available, DTE logic displays the candidate target words to enable the user to select the target word. If the number of target words exceeds a threshold maximum number, DTE logic enables the user to provide additional letters using the abbreviated word format.

15 Claims, 8 Drawing Sheets

700

| | Target Words/syllables | First letter/consonant of each syllable | Alternate input | Other input that closely defines target word |
|---|---|---|---|---|
| 702 → | amplification am/pli/fi/ca/tion | mpfct | apfct | mpfc; apfc |
| | ........ ........ | ........ | ........ | ........ |
| 704 → | excessively ex/ces/sive/ly | xcsl | ecsl | |
| | ........ ........ | ........ | ........ | ........ |
| 706 → | exclusively ex/clu/sive/ly | xcsl | ecsl | |
| | ........ ........ | ........ | ........ | ........ |
| 708 → | exclusivity ex/clu/si/vi/ty | xcsvt | ecsvt | |
| | | | | |
| 710 → | pre-establish pre/es/ta/blish | petb | pestb | |

(56) References Cited

U.S. PATENT DOCUMENTS

| | | | |
|---|---|---|---|
| 2011/0131488 A1* | 6/2011 | Kang | 715/261 |
| 2011/0154193 A1* | 6/2011 | Creutz et al. | 715/261 |
| 2011/0239112 A1* | 9/2011 | Nakano | 715/261 |
| 2012/0005576 A1* | 1/2012 | Assadollahi | 715/261 |
| 2012/0079373 A1* | 3/2012 | Kocienda et al. | 715/261 |
| 2012/0206365 A1* | 8/2012 | Wangsness | 345/169 |
| 2012/0223889 A1* | 9/2012 | Medlock et al. | 345/168 |
| 2013/0222249 A1* | 8/2013 | Pasquero et al. | 345/168 |
| 2013/0321315 A1* | 12/2013 | Chang et al. | 345/173 |

OTHER PUBLICATIONS

Yu et al., Mapping Abbreviations to Full Forms in Biomedical Articles, Google 2002, pp. 1-12.*

Latinov et al., Abbreviation Expansion in Schema Matching and Web Integration, IEEE 2004, pp. 1-5.*

* cited by examiner

FIG. 7

| Target Words/syllables | First letter/consonant of each syllable | Alternate input | Other input that closely defines target word |
|---|---|---|---|
| amplification am/pli/fi/ca/tion ← 702 | mpfct | apfct | mpfc; apfc |
| ...... | ...... | ...... | ...... |
| excessively ex/ces/sive/ly ← 704 | xcsl | ecsl | ...... |
| ...... | ...... | ...... | ...... |
| exclusively ex/clu/sive/ly ← 706 | xcsl | ecsl | ...... |
| ...... | ...... | ...... | |
| exclusivity ex/clu/si/vi/ty ← 708 | xcsvt | ecsvt | |
| pre-establish pre/es/ta/blish ← 710 | petb | pestb | |

700

DYNAMIC TEXT ENTRY/INPUT SYSTEM

BACKGROUND

1. Technical Field

The present disclosure generally relates to word prediction technology within electronic devices and in particular to structured text entry and word prediction technology within electronic devices.

2. Description of the Related Art

Alphanumeric text and/or word entry mechanisms have been slow to adapt to rapid improvements in processing capabilities/speeds and interactive features of the modern personal electronic devices, such as smart phones and laptop and tablet computing electronic systems. Traditionally, in addition to the use of a physical or visually represented alphanumeric keypad of the device, a word completion mechanism has become the primary method by which current word/electronic systems speed up the entry of text and/or word data. However, word ambiguities limit the efficiency of these word completion mechanisms.

SUMMARY OF THE DISCLOSURE

Disclosed are a method, a system and a computer program product for enabling a user to efficiently provide an input sequence to a electronic device, using an abbreviated/shorthand word format, in order for the device to generate a corresponding target word. A dynamic text entry (DTE) logic/utility detects an input sequence that is provided by the user. In one embodiment, DTE logic configures a DTE mode of the electronic device in which the user is able to provide a first letter of each syllable of the target word. DTE logic enables the user to explicitly activate the DTE mode. Alternatively, the DTE mode can be activated based on detected input sequences comprising a series of consonants and/or one or more unique input methodologies, such as providing at least one vowel input with a string of consonants or providing a character or icon input representative of a single word, phrase, or group of words. DTE logic determines whether DTE mode is active based on at least one of: (a) explicit activation of DTE mode; (b) receipt of a sequence of consonants as letter inputs from an input mechanism (by user); (c) receipt of a vowel input via a unique input method. In response to determining that the DTE mode is active, DTE logic determines from the input sequence whether there is a matching sequence stored in a particular DTE library accessible to DTE logic. The DTE library is one or more pre-seeded libraries of character sequences that can represent one or more specific words or phrases without requiring entry of an exact phonetic spelling of any syllable within the words or phrases. The DTE library provides a resource for processing data for the DTE mode.

If no target word is found, DTE logic can indicate to the user that there is an input error. However, in one embodiment, DTE logic performs error detection and/or correction and displays the result of the error detection/correction mechanism (e.g., that searches for a nearest letter sequence) to the user for approval. If there is one target word that matches the input sequence, DTE logic appropriately displays the target word instead of continuing to display the input sequence. However, if DTE logic determines that multiple candidate target words are available, DTE logic displays the candidate target words to enable the user to select the target word. If the number of target words exceeds a threshold maximum number, DTE logic enables the user to provide additional letters on a specific syllable by syllable basis. DTE logic can prompt the user to provide an additional letter(s) for a syllable specifically selected by DTE logic. DTE logic can specifically select the syllable for which an additional letter is desired by determining (from processing library content) that expanding the selected syllable is most likely the most efficient route for resolving an ambiguity and determining the target word. A learning functionality is also provided by DTE utility that enables the utility to update the DTE library based on a self-learning from tracking historical entries made on the electronic device and/or based on user-directed updates of the library.

The above as well as additional objectives, features, and advantages of the present disclosure will become apparent in the following detailed written description.

BRIEF DESCRIPTION OF THE DRAWINGS

The disclosure will best be understood by reference to the following detailed description of an illustrative embodiment when read in conjunction with the accompanying drawings, wherein:

FIG. 7 is a table comprising several example target words and corresponding constituent syllables stored in a DTE library, which can be used to process input sequences for the DTE mode, according to one embodiment.

DETAILED DESCRIPTION OF AN ILLUSTRATIVE EMBODIMENT

Figure 1:
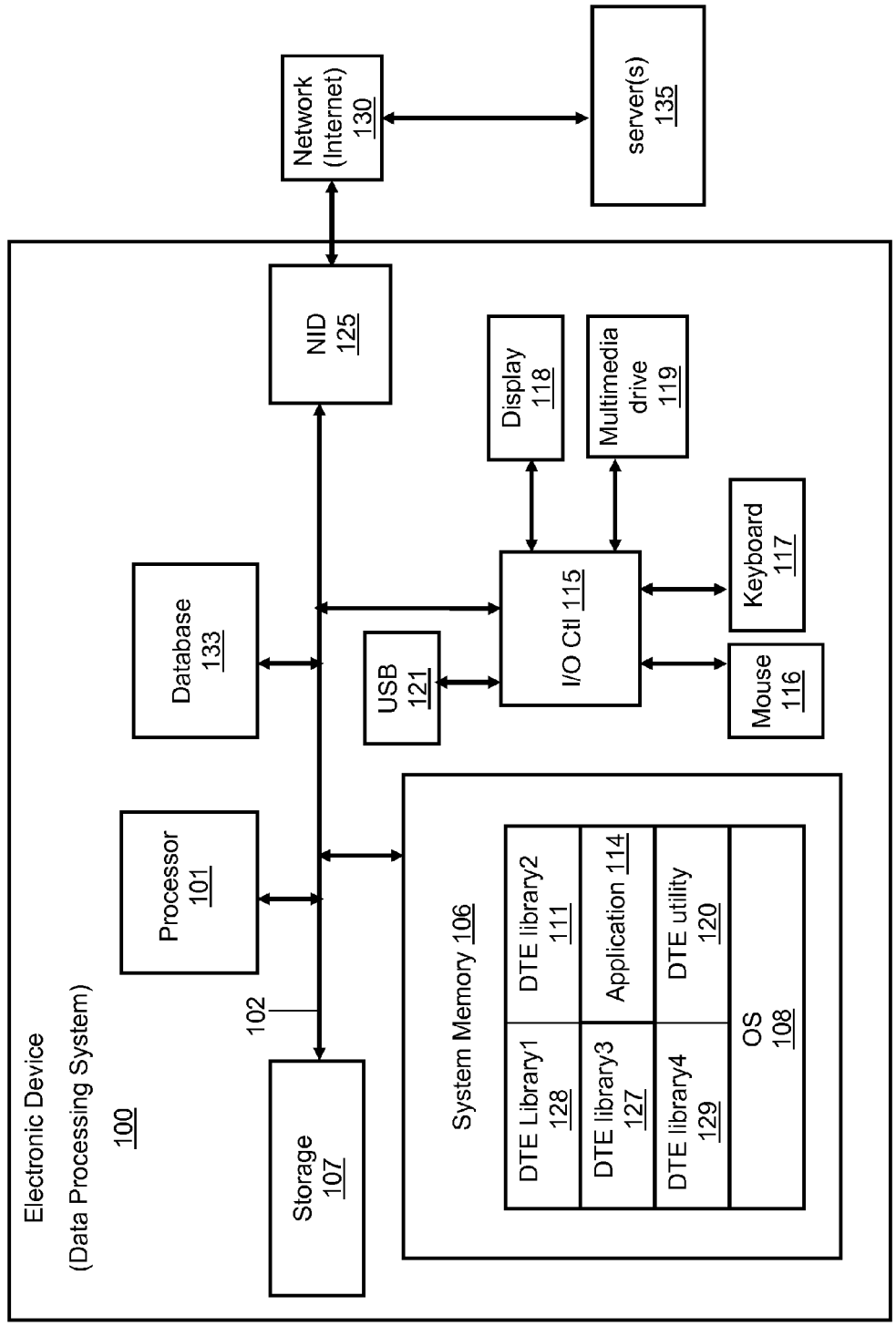
FIG. 1 depicts an example data processing system/device, provided as an example electronic device within which features of the disclosure may be advantageously implemented.

The present disclosure provides a method, system and computer program product for enabling a user to efficiently provide an input sequence to a electronic device, using an abbreviated/shorthand word format, in order for the device to generate a corresponding target word. A dynamic text entry (DTE) logic/utility detects an input sequence that is provided by the user. In one embodiment, DTE logic configures a DTE mode of the electronic device in which the user is able to provide a first letter of each syllable of the target word. DTE logic enables the user to explicitly activate the DTE mode. Alternatively, the DTE mode can be activated based on detected input sequences comprising a series of consonants and/or one or more unique input methodologies, such as providing at least one vowel input with a string of consonants or providing a character or icon input representative of a single word, phrase, or group of words. DTE logic determines whether DTE mode is active based on at least one of: (a) explicit activation of DTE mode; (b) receipt of a sequence of consonants as letter inputs from an input mechanism (by user); (c) receipt of a vowel input via a unique input method. In response to determining that the DTE mode is active, DTE logic determines from the input sequence whether there is a matching sequence stored in a particular DTE library accessible to DTE logic. The DTE library is one or more pre-seeded libraries of character sequences that can represent one or more specific words or phrases without requiring entry of an exact phonetic spelling of any syllable within the words or phrases. The DTE library provides a resource for processing data for the DTE mode.

If no target word is found, DTE logic can indicate to the user that there is an input error. However, in one embodiment, DTE logic performs error detection and/or correction and displays the result of the error detection/correction mechanism (e.g., that searches for a nearest letter sequence) to the user for approval. If there is one target word that matches the input sequence, DTE logic appropriately displays the target word instead of continuing to display the input sequence. However, if DTE logic determines that multiple candidate target words are available, DTE logic displays the candidate target words to enable the user to select the target word. If the number of target words exceeds a threshold maximum number, DTE logic enables the user to provide additional letters on a specific syllable by syllable basis. DTE logic can prompt the user to provide an additional letter(s) for a syllable specifically selected by DTE logic. DTE logic can specifically select the syllable for which an additional letter is desired by determining (from processing library content) that expanding the selected syllable is most likely the most efficient route for resolving an ambiguity and determining the target word. A learning functionality is also provided by DTE utility that enables the utility to update the DTE library based on a self-learning from tracking historical entries made on the electronic device and/or based on user-directed updates of the library.

In the following detailed description of exemplary embodiments of the disclosure, specific exemplary embodiments in which the disclosure may be practiced are described in sufficient detail to enable those skilled in the art to practice the disclosure, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 2xx for FIGS. 2 and 3xx for FIG. 3). The specific numerals assigned to the elements are provided solely to aid in the description and not meant to imply any limitations (structural or functional) on the disclosure.

It is also understood that the use of specific parameter names are for example only and not meant to imply any limitations on the disclosure. The disclosure may thus be implemented with different nomenclature/terminology utilized to describe the above parameters, without limitation.

With reference now to the figures, FIG. 1 depicts an example data processing system/device, which is one example of an electronic device within which features of the disclosure may be advantageously implemented. Data processing system (DPS) 100 comprises a central processing unit (CPU) 101 coupled to a memory 106 via a system bus/interconnect 102. Also coupled to system bus 102 is an input/output controller (I/O Controller) 115, which controls access by several input devices, of which a pointing device, such as mouse 116, and keyboard 117 are illustrated. I/O Controller 115 also controls access to output devices, of which display 118 is illustrated. As noted above, display may be an electronic touch screen display.

In addition to the above described hardware components of DPS 100, various features of the invention may be completed or supported via software or firmware code and/or logic stored within at least one of memory 106 and local storage 107, and respectively executed by or processor 101. According to one aspect of the disclosure, the software or firmware code and/or logic supports the various processing functions of DSP 100. Thus, for example, included within system memory 106 and/or storage 107 are a number of software, firmware, logic components, or modules, including several dynamic text entry libraries (e.g., 111, 128), applications 114, and operating system (OS) 108. In addition, system memory 106 comprises dynamic text entry (DTE) utility 120.

Figure 2:
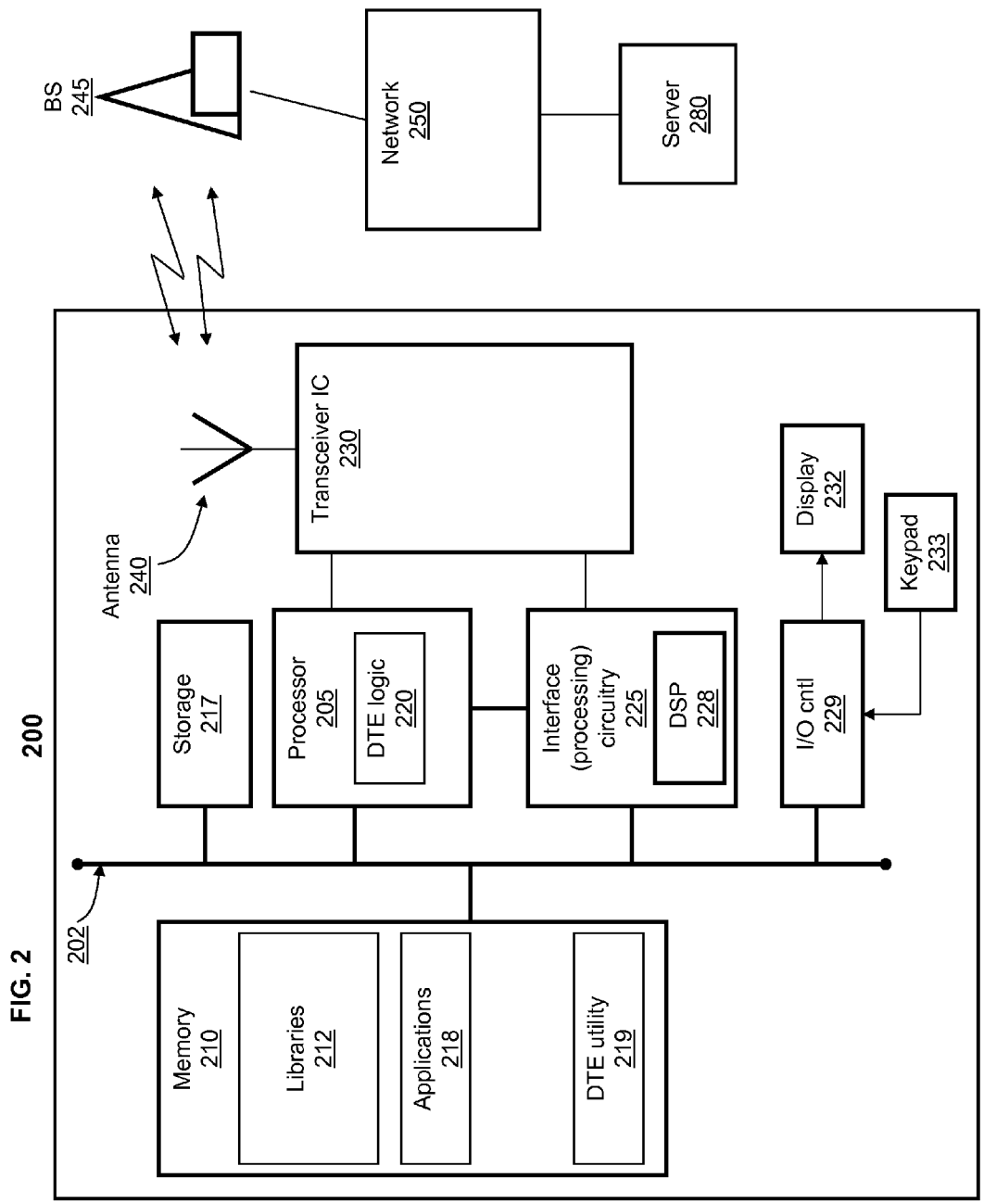
FIG. 2 depicts an example interactive wireless communication device, provided as another example of an electronic device within which features of the disclosure may be advantageously implemented.

With reference now to the figures, FIG. 2 depicts an example interactive wireless communication device (WCD), provided as an electronic system within which features of the disclosure may be advantageously implemented. Wireless communication device (WCD) 200 represents a device that is adapted to transmit and receive electromagnetic signals over an air interface via uplink and/or downlink channels between the wireless communication device 200 and communication network equipment (e.g., base-station 245) utilizing a plurality of different communication standards, such as Global System for Mobile Communications (GSM) Code Division Multiple Access (CDMA), Orthogonal Frequency Division Multiple Access (OFDMA), and similar systems. In one or more embodiments, the wireless communication device can be a mobile cellular device/phone or smartphone, or laptop, netbook or tablet computing device, or other types of communications devices. Wireless communication device 200 comprises processor 205 and interface circuitry 225, which are connected to memory component 206 via signal bus 202. Interface circuitry 225 includes digital signal processor (DSP) 228. Wireless communication device 200 also comprises Input/Output (I/O) controller 229 coupled to both display 232 and keypad 233.

In addition, wireless communication device 200 comprises storage 217. Wireless communication device 200 also includes a transceiver module 230 for sending and receiving communication signals. In at least some embodiments, the sending and receiving of communication signals occur wirelessly and are facilitated by one or more antennas 240 coupled to transceiver module 230. The number of antennas can vary from device to device, ranging from one or more antennas, and the presentation within wireless communication device 200 of one antenna 240 is merely for illustration.

Wireless communication device 200 is able to wirelessly communicate to base-station 245 via antenna 240. Base-station 245 can be any one of a number of different types of network stations and/or antennas associated with the infrastructure of the wireless network and configured to support uplink and downlink communication via one or more of the wireless communication protocols, as known by those skilled in the art.

In addition to the above described hardware components of wireless communication device 200, various features of the invention may be completed or supported via software or firmware code and/or logic stored within at least one of memory 210 and local storage 217, and respectively executed by DSP 228 or processor 205. According to one aspect of the disclosure, the software or firmware code and/or logic supports the various processing functions of wireless communication device 200. Thus, for example, included within system memory 210 and/or storage 217 are a number of software, firmware, logic components, or modules, including libraries 212, applications 218, and dynamic text entry (DTE) utility 219.

Those of ordinary skill in the art will appreciate that the hardware depicted in FIG. 1 and FIG. 2 may vary. For example, other peripheral devices, such as optical disk drives and the like, also may be used in addition to or in place of the hardware depicted. Thus, the depicted example is not meant to imply architectural limitations with respect to the present disclosure.

Various features of the disclosure are provided as software code stored within memory 106 or other storage and executed by processor(s) 101. Among the software code are code for enabling the Dynamic Text Entry (DTE) features described below. For simplicity, the collective body of code that enables the DTE features is referred to herein as DTE utility. In actual implementation, the DTE utility may be added to existing operating system (OS) code to provide the DTE functionality described below.

According to the illustrative embodiment, when processor 101 executes DTE utility 120, DTE utility 120 enables device 100 to complete a series of functional processes including features/functionality described below and illustrated by the Figures.

The Dynamic Text Entry (DTE) Logic/Utility pre-configures DPS 100/WCD 100 to enable a user to provide, using an abbreviated word format, a sequence of input characters that are a selected subset of letters in a target word. In response to initiation/activation of a DTE technology mode, WCD 200 processes a sequence of input characters as characters received in the abbreviated word format. In one embodiment, DTE logic 220 enables the user to sequentially select letters from a subset of all the letters in a corresponding target word based on a relative order of letters in the target word.

DTE logic 220 may dynamically configure WCD 200 to accept input characters using a pre-determined structure/format. For example, in one implementation, a user may provide only consonants (i.e., no vowels) as input characters. The user may further decide to provide only a subset of the consonants, if the subset (of consonants) is what the user believes is necessary to identify the word. For example, the word e-x-c-l-u-s-i-v-e-l-y provides the following order of consonants x-c-l-s-v-l-y. A user may choose to omit the "s-v" letter sequence and provide "x-c-l-y" as a selected input character sequence. The motivation of the user may be to provide an unambiguous start (i.e., using letters "x-c-l") and a clear conclusion (i.e., using letter "y") of the target word.

In another example, DTE logic 220 can dynamically configure WCD 200 to provide an input structure to accept a first letter of all syllables or a subset of the syllables within a target word. Thus, the user can provide an input sequence of e-c-s-l for the target word e-x-c-l-u-s-i-v-e-l-y. If the user wishes to provide additional letters of a sequence, the user can automatically enter additional letters by using a specific input method and/or at least one gesture to indicate that an input sequence for a current syllable is still actively being provided. For example, on a touch screen a user may drag or "swipe" his finger across an input key for a second letter that follows an input key of a first letter to indicate that the second letter follows the first letter in a same syllable as the first letter. Alternatively, DTE logic 220 is configured to enable the user to depress a first letter input key corresponding to the first letter of a syllable and continue to input other subsequent letters of the (same) syllable while the first letter input key is still depressed. In addition, DTE logic 220 is configured to enable the user to provide, for a single word, at least one letter of a selected syllable while choosing to exclude or "skip" all representation of a specific syllable by excluding an input of all letters for the specific syllable. In one implementation, DTE logic 220 excludes a syllable from being represented in an input sequence by enabling the user to depress and release a space bar while (a) a first letter input key of a previous syllable is depressed and (b) the space bar is the last input key that is depressed and released while the first letter input key of the previous syllable remains depressed. Alternatively, DTE logic 220 excludes a syllable from being represented by enabling the user to depress and release the space bar while (a) a first letter input key of a subsequent syllable is depressed and (b) the space bar is the first input key that is depressed and released while the first letter input key of the subsequent syllable is depressed. In one implementation, a single space-bar input can be used to indicate that one syllable is being excluded. In another implementation, a single spacebar input can be used to indicate that at least one syllable is being excluded from being represented in the input sequence for a particular target word while using an abbreviated word format. By enabling the user to provide multiple input letters for a selected syllable and to exclude explicit representation of a particular syllable(s) and skip forward within a input sequence corresponding to a single target word, DTE logic 220 enables a user to selectively include within or selectively exclude from a corresponding input sequence virtually any letter and/or any syllable of a target word while using the abbreviated word format.

In one embodiment, DTE logic 220 enables a (DTE) word processing/prediction technology which corresponds to the abbreviated word format to be simultaneously activated while at least one other word prediction technology is activated within WCD 220 to process a character input sequence received via a single keyboard/keypad 233. If a single specific word prediction mode or technology is not explicitly selected or identified for an initiated input sequence, DTE logic 220 determines a most likely word prediction technology that the user intends to use based on letter input characteristics and/or the number of word prediction and/or word correction options triggered when the initiated input sequence is processed using the simultaneously activated word processing technologies. In one embodiment, DTE logic 220 designates respective segments of the display 232 for presenting word prediction/correction results corresponding to the simultaneously activated word prediction technologies while DTE logic 220 has not identified the single specific mode that the user intends to utilize.

In one embodiment, when DTE logic 220 detects that a user has provided at least a first segment of a sequence of input characters and identifies the corresponding inputs that include the first segment as having a pre-determined length, DTE logic 220 identifies/generates a set of candidate target words using at least the first segment. For example, DTE logic 220 determines whether the first segment of the sequence matches a stored character segment that corresponds to at least one candidate word from a corresponding library. In response to the size of the set of candidate target words comprising a single word, DTE logic 220 identifies/designates the single word as the target word and displays the single word instead of further displaying the sequence of characters provided by the user.

In response to the size of the set of candidate target words including more than a single word, DTE logic 220, in one embodiment, provides the user with a list of candidate target words to enable the user to select the target word from among the list of candidate target words that are being displayed. In one embodiment, the displayed candidate target words are provided using a word completion mechanism by which the user is able to continue providing input characters and the set of candidate target words can be dynamically adjusted based on the receipt of additional characters or letters. If the size of the set of candidate target words is greater than a threshold maximum that limits the display of candidate target words, DTE logic 220 minimizes the size of the set of candidate target words by processing at least one additional character received from the user and which follows the first sequence of characters. In one embodiment, DTE logic 220 can display the received letters and prompt the user to provide additional input letters for syllables that DTE logic 220 determine can best be used, when expanded, to minimize the number of candidate target words. In response to the size of the set of candidate target words being minimized to a single word, DTE logic 220 automatically identifies the single word as the target word.

DTE logic 220 pre-configures a library of target words based on an input format being utilized by the user. For example, the word exclusively can be stored in the library in a matter that enables DTE logic 220 to efficiently identify each syllable segment of the word. In particular, exclusively comprises the following syllables: (a) e-x; (b) c-l-u; (c) s-i-v-e; and (d) l-y. In one embodiment, DTE logic 220 automatically determines the syllables of a target word, maps the syllables to the target word and stores the corresponding syllables. In one embodiment, DTE logic 220 may utilize an enhanced, custom syllable identification procedure/algorithm for DTE. For example, e-d-u-c-a-t-i-o-n, according to accepted English language standards, comprises the following syllables: (a) e-d; (b) u; (c) c-a; (d) t-i-o-n. However, in one embodiment, DTE logic 220 uses a set of pre-determined rules that specify that syllables for DTE mode are to be primarily initiated by a consonant. However, in cases in which the first letter of a target word is a vowel, DTE logic 220 can identify a vowel as the first letter of the first syllable to enable subsequent syllables to satisfy a preference for syllables to begin with a consonant. Thus, e-d-u-c-a-t-i-o-n, according to DTE mode library, can comprise the following syllables: (a) e; (b) d-u; (c) c-a; (d) t-i-o-n. The library for DTE mode can re-define the three syllable word un/fur/nished to be a four syllable word which can be stored as un/fur/ni/shed, for example.

In one embodiment, DTE logic 220 enables the user to utilize any of the two (or more) libraries that store syllable segments. In another embodiment, when vowel inputs are necessary, DTE logic 220 enables the user to use a unique input mechanism for vowels. For example, a special key input may be used to follow an input of a vowel or a specific gesture. As another example, dragging a finger vertically through a specific vowel key, can be used to enter a vowel. Furthermore, DTE logic 220 is able to process the unique input mechanism or specific gesture to receive an indication of the user's intent that the input sequence is processed in DTE mode. In one embodiment, the unique input mechanism or specific gesture may be utilized once to explicitly indicate that DTE mode is being used for a particular target word. DTE logic 220 can indicate to the user that DTE mode is active by using a specific text, icon and/or highlight mechanism. In one embodiment, DTE logic 220 enables a user to activate DTE mode for specific words by using a specific key at the beginning of an input sequence, while the sequence is being entered, or at the end of the sequence before the space bar or other word delimiter is entered.

If the user provides an input sequence of e-c-s-l (in order to obtain the target word e-x-c-l-u-s-i-v-e-l-y), DTE logic 220 identifies at least two candidate target words using the same initial letters for syllables in a target word. In particular, e-x-c-e-s-s-i-v-e-l-y (i.e., [e-x] [c-e-s] [s-i-v-e] [l-y]) and e-x-c-l-u-s-i-v-e-l-y both share the same set of initial syllabic letters (i.e., e-c-s-l). In one embodiment, DTE logic 220 presents the user with the at least two candidate target words to enable the user to select the actual target word. In one embodiment, DTE logic 220 can present a target word highlighting the first letter of all syllables or a subset of the syllables and any additional letters that can be used to uniquely generate the target word in the DTE mode. Thus, DTE logic 220 enables the user to learn a most efficient way to identify a target word if desired.

In addition to accepting alphanumeric characters/letters in an abbreviated word input structure of a first DTE mode, DTE logic 220 provides a second DTE mode that enables the user to provide, in addition to alphabetic characters, input characters from among additional types of characters that represent at least one subset of the letters in the target word. The additional types of characters can include: (a) alphabetic text provided by the user in a second type of word format; (a) numeric text; (b) text icons; and (c) graphical icons. In one embodiment, DTE logic 220 converts, into an alphabetical sequence representation, a sequence of input characters that include characters from among the additional types of characters. For example, ".ly" or ".cl" can be stored as a (user) preset abbreviation for the target word "periodically". In one embodiment, in a particular DTE mode, DTE logic 220 enables users to utilize user preset abbreviations or other standard preset abbreviations combined with input sequences that can be provided by the DTE mode using the "first letter of a syllable" input mechanism. These user preset abbreviations can be stored within a DTE library that can include a pre-generated set of default abbreviations as well as user-created or autonomously generated abbreviations. DTE logic 220 then determines, from the alphabetical sequence representation, the target word or at least two candidate target words.

DTE logic 220 enables the user to dynamically save input sequences as a preset abbreviation for a corresponding target word. The preset abbreviation can be interpreted in another DTE mode as a shorthand sequence for the target word. DTE logic 220 can provide the user with an indication of a number of target words that is mapped to an input sequence and can suggest a better input sequence that can uniquely identify the target word or minimize the number of candidate target words associated with a particular input sequence. In response to an input sequence being stored as a preset abbreviation, DTE logic 220 enables the stored preset abbreviation to be processed as any one of: (a) a sequence in the abbreviated word format; and (b) a pre-set word abbreviation.

In one embodiment, DTE logic 220 uses a single preset abbreviation to represent multiple words. For example, "in my humble opinion" can be stored as "imho."

In one embodiment, DTE logic 220 can map particular libraries to specific types of applications. In particular, DTE logic 220 may enable a user to select a library to map to a particular application for the duration of a specific task. A user may have separate formal/professional and casual/friendly libraries when drafting messages to colleagues and/ or friends. DTE logic 220 also enables the user to export at least one of the user library and selected library contents to other local platform applications and external platform applications. The user is also able to import other user libraries. DTE logic 220 enables users to create and share libraries. Users are able to rate library contents (e.g., for efficiency) and library creators in a social media environment.

In one embodiment, DTE logic 220 automatically determines whether a user utilizes a particular input format without the user having to explicitly initiate, using a particular input, the DTE mode for a particular set of words. After processing a first segment of an input sequence, DTE logic 220 can determine by statistical analysis the most probable input format. For example, by providing letter inputs that include only (a) consonants and (b) a limited number of vowels that are provided as inputs by using a specific gesture or pre-selected key, DTE logic 220 is able to uniquely identify the input format that the user intends to use.

In one embodiment, to utilize less bandwidth, DTE logic 220 can transmit information in an abbreviated format of the DTE mode and convert into un-abbreviated mode using target words on the receiving end. Thus, the DTE mode can be used as a compression format for transmitting data.

DTE logic 220 can enable a user to display words in abbreviated word format for a complete document or a segment of the document and convert the relevant words of the complete document to target words at a later time. DTE logic 220 can enable the user to trigger a function to convert abbreviated words in the document into target words. As a result, DTE logic 220 can enable the user to have greater privacy using coded data while a document is being drafted.

DTE logic 220 can highlight a shortest length sequence that is necessary to provide less than a preset number of candidate target words in order to enable the user to learn a more efficient input sequence to a corresponding target word.

DTE logic 220 can create pseudo-syllables. DTE logic 220 can allow the word "performed" having a pair of syllables (i.e., per/formed) to be stored in DTE mode library as a three syllable word such as "per/for/med". In one embodiment, DTE logic 220 can more efficiently provide the target word when the user provides multiple character entry for a last syllable (and/or other specific syllables). Thus, for example, a user input sequence "pfme" with the input sequence segment "me" representing the first two letters for the last syllable of "per/for/med" (or an input sequence segment "md" as the first letter and last letter) can be used to avoid and/or minimize ambiguities and distinguish the received input sequence from an input sequence targeting other words such as per/for/ming or per/for/mance, for example. In one embodiment, DTE logic 220 enables the user to use a corresponding specific input mechanism when the user wishes to indicate/specify that the input sequence segment for a particular syllable is to be processed as one or more of (a) consecutive letters of the particular syllable in a target word, (b) first and last letters of a target word, and (c) some other specific type of character pairing.

In one embodiment, DTE logic 220 can automatically segment words into syllables for use with particular DTE mode libraries.

Figure 3:
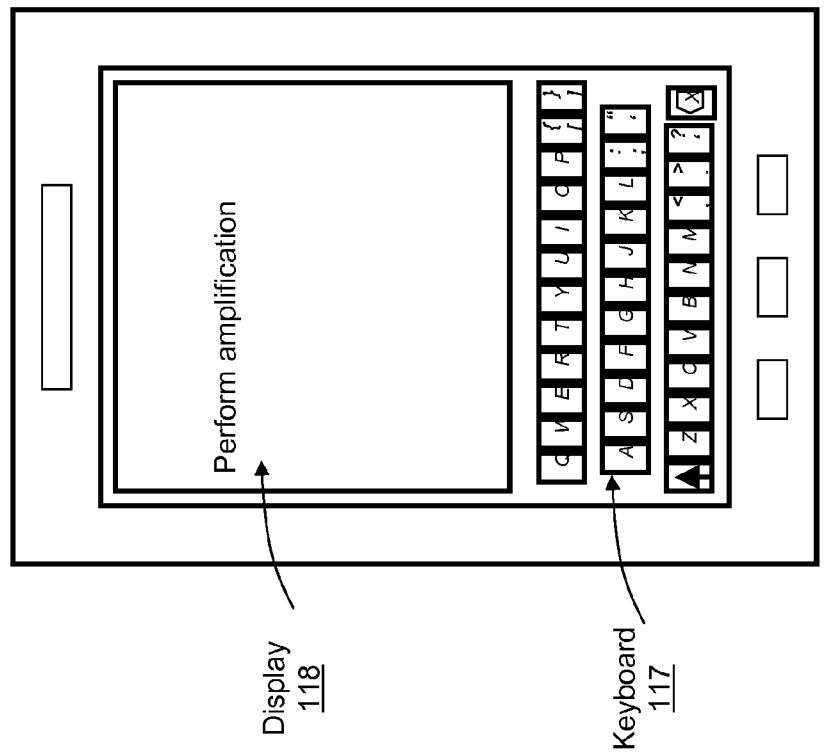
FIG. 3 is an illustration of an external view of an example electronic device, according to one embodiment.

FIG. 3 is an illustration of an external view of an example electronic device system, according to one embodiment. As shown, electronic system 300 provides a display and a keyboard. Electronic device 300 can represent any one of a number of data processing systems including a laptop and a tablet personal computer.

Figure 4:
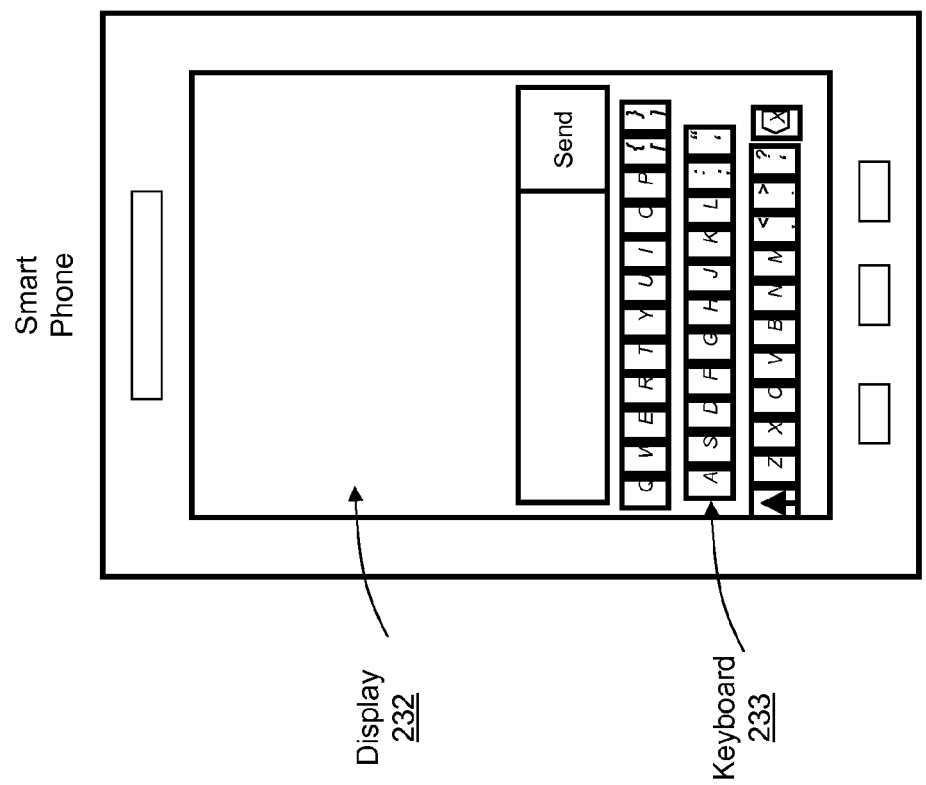
FIG. 4 is an illustration of an external view of an example wireless communication device, according to one embodiment.

FIG. 4 is an illustration of an external view of an example wireless communication device, according to one embodiment. As shown, wireless communication device (WCD) 300 provides a display and a keyboard. WCD 400 can represent any one of a number of wireless communication devices including a cell-phone and a smart-phone.

Figure 5:
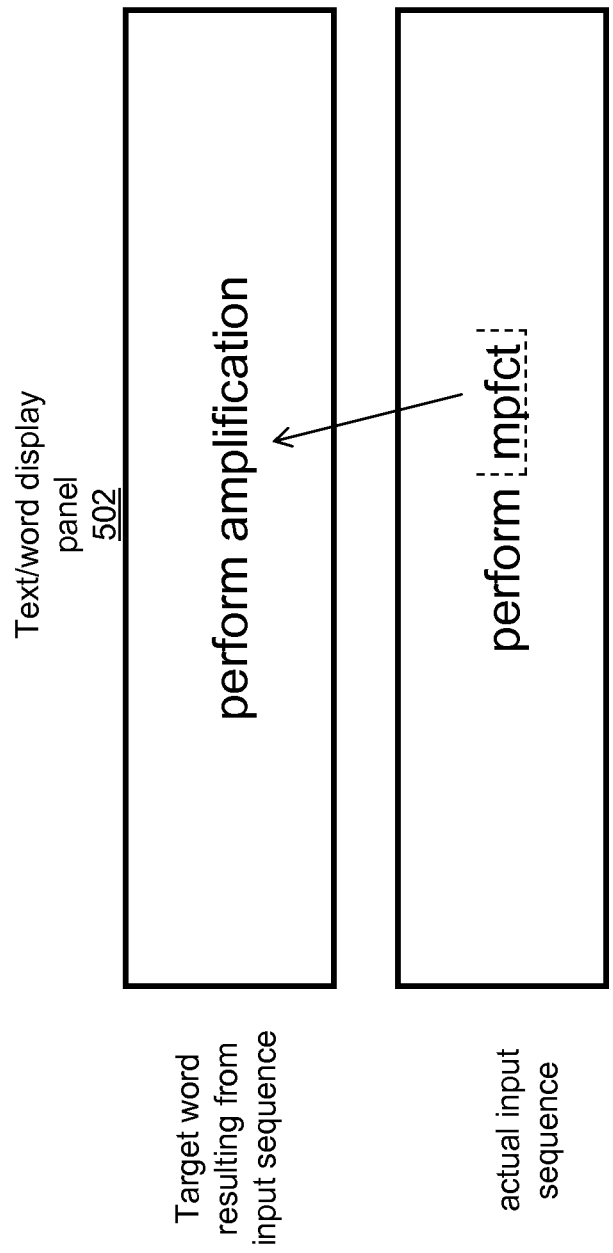
FIG. 5 provides a multiple views of a character input and target word display panel showing an input sequence and a target word generated when the input sequence is processed in the dynamic text entry (DTE) mode, according to one embodiment.

FIG. 5 provides two views of a word/text display panel showing an input sequence and a target word generated when the input sequence is processed in the dynamic text entry (DTE) mode, according to one embodiment. In one embodiment, the first word display panel and the second word display panel represent a same word display panel 502 of display 500 but represent different stages of processing of an input character sequence In DPS 300/WCD 400, a user first enters the letters/word "perform" in a standard text entry mode. The user then enters the letters "mpfct". DTE logic 220 detects that a sequence of letters has been entered without using a single vowel. In one embodiment, DTE logic 220 determines that a user wishes to use a first DTE mode to process the input sequence. In the first DTE mode, a user enters a first letter of each syllable of a target word. The user is encouraged to use all consonants if possible. A simple intuitive method can be employed to determine how to start and end a syllable while in the first DTE mode. However, in one embodiment, several methods of identifying syllables in the first DTE mode or other DTE modes can be employed. If a first letter of a first syllable is a vowel the user may enter/use the first consonant of the first syllable as the first letter of the input sequence. DTE logic 220 uses the letters "mpfct" as an index to a library database to determine whether any candidate target words match the current index. DTE logic 220 determines that the corresponding target word is "amplification" and displays "amplification" in the output panel. Thus, DTE logic 220 receives a five (5) letter input from the user and efficiently returns a thirteen (13) letter output without requiring the user to utilize any special keys. Alternatively, in one embodiment, the user enters the letters "mpfc" and DTE logic 220 is still able to return "amplification" as a target word. The user is able to determine that either a single target word (i.e., no ambiguity) or an acceptable number of candidate target words can match the relatively shorter sequence "mpfc". DTE logic 220 is able to identify the same target word with the shorter sequence of four (4) letters since the library for the DTE mode also provides the shortest sequence that can be used to identify the target word. In one embodiment, DTE logic 220 is able to determine after a particular number of letters (e.g., 3 letters) that DTE mode is expected (i.e., implied by the type of user inputs) and starts to process the inputs in DTE mode to obtain a target word or a number of candidate target words.

Figure 6:
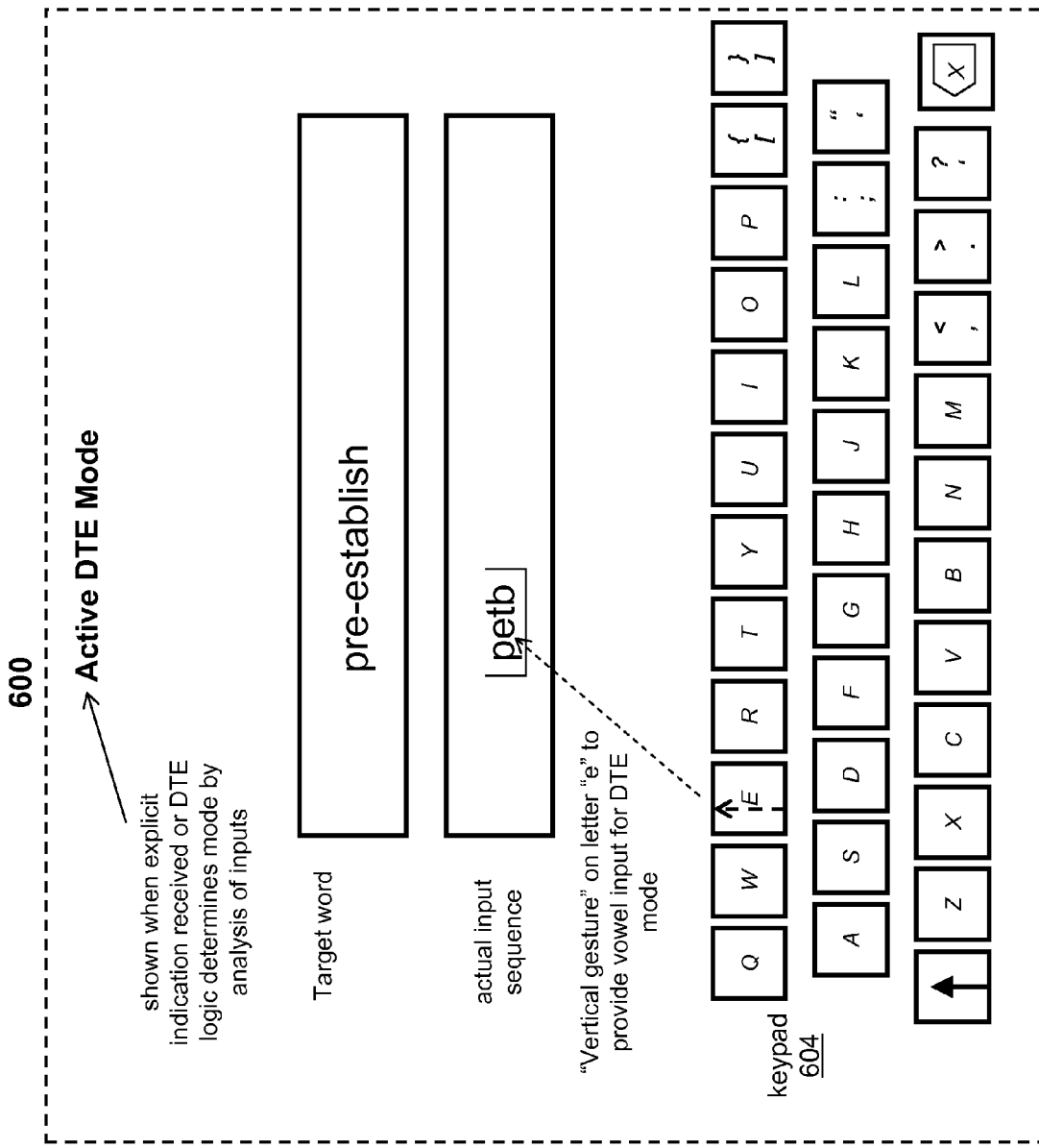
FIG. 6 illustrates an electronic touch screen display having a touch screen keypad and a word/text display panel showing an input sequence and a target word generated when the input sequence is processed in the dynamic text entry (DTE) mode, according to one embodiment.

FIG. 6 illustrates an electronic touch screen display, according to one embodiment. Touch screen display 600 has a touch screen keypad 604 and a word/text display panel 602 showing an input sequence and a target word generated when the input sequence is processed in the dynamic text entry (DTE) mode.

In electronic device 300/WCD 400, a user first enters the letters "petb". However, in one embodiment, the user enters the character "e", which is the only vowel provided, by using a unique key or gesture that can be processed using a touch screen. On the touch screen, the user drags his/her finger vertically along the "e" key. DTE logic 220 detects the use of the special key or gesture and determines that the user intends for the input sequence to be processed using DTE technology mode. DTE logic 220 provides an indication that DTE mode is active. In one embodiment, the user is able to touch the location of a DTE mode status indicator (or use a specific key) to toggle the DTE mode status between an active and an inactive status.

DTE logic 220 uses the letters "petb" as an index to determine whether any candidate target words match the current index. DTE logic 220 determines that the corresponding target word is "pre-establish" and displays "pre-establish" in the output panel. As an alternative, the user can avoid the use of special keys and gestures and simply activate the DTE mode for a particular word or sequence of words. In one embodiment, while the DTE mode is activated, DTE logic 220 can enable the user to have an input sequence processed in standard text processing format. For example, the input sequence that the user wishes to have processed in standard format may find no match in the DTE mode library and the standard text processing may then be utilized as an alternative methodology for processing the input sequence. In addition, DTE logic 220 can determine by the type of inputs the most likely desired processing format.

FIG. 7 is a table comprising several example target words and corresponding constituent syllables that are stored in a DTE library that can be used to process input sequences for the DTE mode, according to one embodiment. In row 702 of table 700, the target word "amplification" is identified and illustrated as "am/pli/fi/ca/tion" to separately identify the specific syllables of the target word. A complete input character sequence, "mpfct," comprising a first consonant of each syllable and corresponding to the target word is shown. In addition, an alternate sequence, "apfct," comprising a first letter of each syllable and corresponding to the target word is shown. In addition, two input character sequences in which the last syllable is not represented are shown as "mpfc" and "apfc" respectively.

Figure 8:
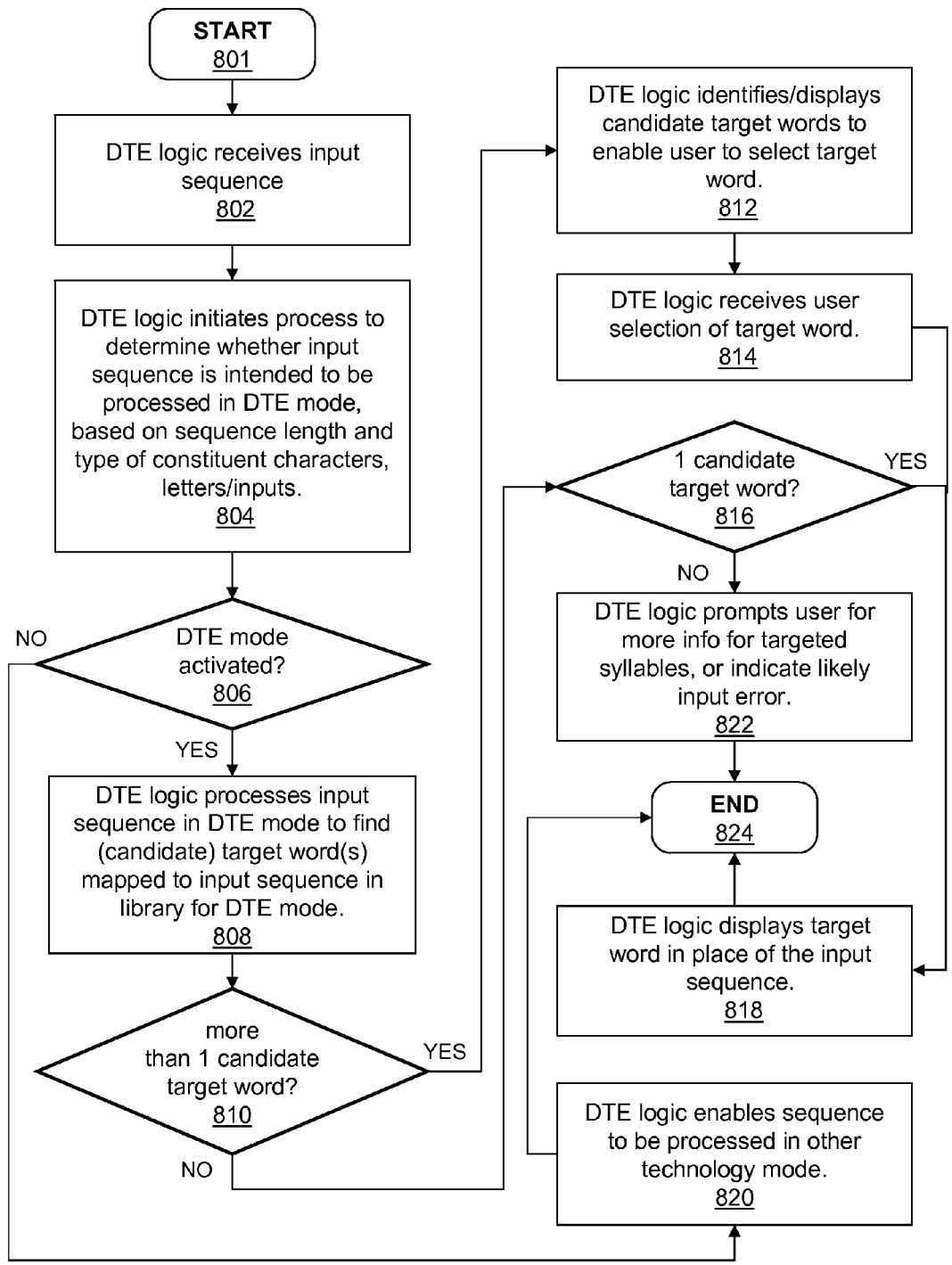
FIG. 8 is a flow chart that illustrates the process for generating a target word by processing an input sequence utilizing a DTE word processing and prediction technology, according to one embodiment.

FIG. 8 is a flow chart illustrating an embodiment of the method by which the above processes of the illustrative embodiments can be implemented. Specifically, FIG. 8 illustrates one embodiment of a method for generating a target word by processing an input sequence using a DTE word processing and prediction technology. Although the method illustrated by FIG. 8 may be described with reference to components and functionality illustrated by and described in reference to FIGS. 1-7, it should be understood that this is merely for convenience and alternative components and/or configurations thereof can be employed when implementing the method. Certain portions of the methods may be completed by DTE utility 120/219 executing on one or more processors (processor 105/205) within data processing system 100 (FIG. 1) or wireless communication device 200 (FIG. 2). The executed processes then control specific operations of or on display 118/232. For simplicity in describing the method, all method processes are described from the perspective of DTE utility 219 or DTE logic 220.

The method of FIG. 8 begins at initiator block 801 and proceeds to block 802 at which DTE logic 220 receives an input character sequence that a user enters via keyboard 233. DTE logic 220 initiates a process to determine whether the received input character sequence is intended to be processed in DTE processing technology mode. DTE logic 220 determines the word processing and prediction technology that the user intends to utilize for processing the input character sequence, based on one of: (a) a sequence length and the characteristics of the constituent characters of the input character sequence; and (b) explicit indication from the user (block 804). DTE logic 220 determines whether the DTE technology mode is the intended mode of the user (decision block 806). If the DTE technology mode is not the intended mode of the user, DTE logic 220 enables the input character sequence to be processed using some other word processing technology (block 820). However, if the DTE technology mode is the intended mode of the user, DTE logic 220 processes the input character sequence using DTE technology mode by finding a (candidate) target word mapped to the input character sequence in DTE library 211 for DTE technology mode (block 808). DTE logic 220 determines whether more than one candidate target word is identified (decision block 810).

If more than one candidate target word is identified, DTE logic 220 identifies/displays the candidate target words to enable the user to select the target word (block 812). DTE logic 220 receives indication of a user selection of the target word (block 814). If DTE logic 220 determines that no more than one (candidate) target word is identified, DTE logic 220 determines whether one candidate target word is identified (decision block 816). However, if no candidate target words are identified, DTE logic 220 prompts user to provide more input characters and provide a correction. In one embodiment, DTE logic indicates that an error can be likely and/or highlights particular syllables that are likely sources of input error (block 822). In response to identifying the target word, DTE logic 220 displays the target word in place of the input character sequence (block 818). The process ends at block 824.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The flow charts and block diagrams in the various figures presented and described herein illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the disclosure. Thus, while the method processes are described and illustrated in a particular sequence, use of a specific sequence of processes is not meant to imply any limitations on the disclosure. Changes may be made with regards to the sequence of processes without departing from the spirit or scope of the present disclosure. Use of a particular sequence is therefore, not to be taken in a limiting sense, and the scope of the present disclosure extends to the appended claims and equivalents thereof As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present disclosure may be implemented using any combination of software, firmware or hardware. As a preparatory step to practicing the disclosure in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the disclosure. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the disclosure may be practiced by combining one or more machine-readable storage devices containing the code according to the present disclosure with appropriate processing hardware to execute the code contained therein. An apparatus for practicing the disclosure could be one or more processing devices and storage systems containing or having network access to program(s) coded in accordance with the disclosure.

Thus, it is important that while an illustrative embodiment of the present disclosure is described in the context of a fully functional computer (server) system with installed (or executed) software, those skilled in the art will appreciate that the software aspects of an illustrative embodiment of the present disclosure are capable of being distributed as a program product in a variety of forms, and that an illustrative embodiment of the present disclosure applies equally regardless of the particular type of media used to actually carry out the distribution.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. In a data processing system (DPS), a method comprising:
    pre-configuring the DPS to enable a user to provide, using an abbreviated word format, a sequence of input characters that are a dynamically selected subset of letters in a target word, wherein the input characters of the dynamically selected subset of letters in the target word are selected from at least one of (a) a first letter of each respective syllable of the target word and (b) consonants in the target word;
    wherein said pre-configuring further comprises: enabling the user to dynamically and selectively provide as inputs letters from a subset of all the letters in a corresponding target word based on a relative order of letters in the target word;
    receiving the sequence of input characters from the user;
    processing the set of input characters received from the user as characters received in the abbreviated word format;
    generating at least one candidate target word corresponding to the set of input characters provided by the user; and
    displaying the candidate target word.

2. The method of claim 1, wherein said processing further comprises: identifying a first segment of the sequence of input characters, wherein the first segment has a pre-determined length; generating a set of candidate target words using at least the first segment; and in response to a size of the set of candidate target words being equal to a single word: identifying the single word as the target word; and displaying the single word in place of the sequence of characters provided by the user.

3. The method of claim 2, wherein said processing further comprises: in response to the size of the set of candidate target words being greater than a single word, identifying the target word by at least one of the following: (a) user selection of the target word from among a set of predicted words, and (b) minimizing the size of the set of candidate target words by processing at least one additional character that follows the first segment and is received from the user.

4. The method of claim 1, further comprising: processing the set of input characters using at least one pre-defined library of input sequences mapped to respective target words; and enabling a user to select a pre-defined library to be mapped to a particular application for processing of input characters associated with the application.

5. In a data processing system (DPS), a method comprising:
    pre-configuring the DPS to enable a user to provide, using an abbreviated word format, a sequence of input characters that are a dynamically selected subset of letters in a target word, wherein the input characters of the dynamically selected subset of letters in the target word are selected from at least one of (a) a first letter of each respective syllable of the target word and (b) consonants in the target word;
    wherein said pre-configuring further comprises: enabling the user to dynamically and selectively provide as inputs letters from a subset of all the letters in a corresponding target word based on a relative order of letters in the target word;
    receiving the sequence of input characters from the user;
    processing the set of input characters received from the user as characters received in the abbreviated word format;
    generating at least one candidate target word corresponding to the set of input characters provided by the user;
    displaying the candidate target word;
    enabling the user to export at least one of a pre-defined library and selected library contents to other local platform applications and external platform applications; and
    enabling the user to import external libraries.

6. In a data processing system (DPS), a method comprising:
    re-configuring the DPS to enable a user to provide, using an abbreviated word format, a sequence of input characters that are a dynamically selected subset of letters in a target word, wherein the input characters of the dynamically selected subset of letters in the target word are selected from at least one of (a) a first letter of each respective syllable of the target word and (b) consonants in the target word;
    wherein said pre-configuring further comprises: enabling the user to dynamically and selectively provide as inputs letters from a subset of all the letters in a corresponding target word based on a relative order of letters in the target word;

receiving the sequence of input characters from the user;

processing the set of input characters received from the user as characters received in the abbreviated word format;

generating at least one candidate target word corresponding to the set of input characters provided by the user;

displaying the candidate target word;

determining that a sequence of input characters is provided by the user using the abbreviated word format associated with a dynamic text entry (DTE) word processing technology based on at least one of: (a) receipt of an input from the user indicating that the abbreviated word format is currently being utilized; and (b) analysis of input characteristics associated with the sequence of input characters to determine whether the input characteristics are uniquely associated with a dynamic text entry (DTE) word processing technology;

in response to determining that the sequence of input characters is provided by the user using the abbreviated word format associated with the DTE word processing technology, processing the sequence of input letters using DTE word processing technology in order to generate said at least one candidate target word; and in response to determining that the sequence of input characters provided by the user does not use the abbreviated word format associated with the DTE word processing technology, processing the sequence of input letters using another word processing technology in order to generate at least one candidate target word.

7. The method of claim 1, wherein the input characters selected from said consonants in the target word include a last letter of at least one syllable that ends with a consonant.

8. The method of claim 5, wherein said processing further comprises: identifying a first segment of the sequence of input characters, wherein the first segment has a pre-determined length; generating a set of candidate target words using at least the first segment; and in response to a size of the set of candidate target words being equal to a single word: identifying the single word as the target word; and displaying the single word in place of the sequence of characters provided by the user.

9. The method of claim 8, wherein said processing further comprises: in response to the size of the set of candidate target words being greater than a single word, identifying the target word by at least one of the following: (a) user selection of the target word from among a set of predicted words, and (b) minimizing the size of the set of candidate target words by processing at least one additional character that follows the first segment and is received from the user.

10. The method of claim 5, further comprising: processing the set of input characters using at least one pre-defined library of input sequences mapped to respective target words; and enabling a user to select a pre-defined library to be mapped to a particular application for processing of input characters associated with the application.

11. The method of claim 5, wherein the input characters selected from said consonants in the target word include a last letter of at least one syllable that ends with a consonant.

12. The method of claim 6, wherein said processing further comprises: identifying a first segment of the sequence of input characters, wherein the first segment has a pre-determined length; generating a set of candidate target words using at least the first segment; and in response to a size of the set of candidate target words being equal to a single word: identifying the single word as the target word; and displaying the single word in place of the sequence of characters provided by the user.

13. The method of claim 12, wherein said processing further comprises: in response to the size of the set of candidate target words being greater than a single word, identifying the target word by at least one of the following: (a) user selection of the target word from among a set of predicted words, and (b) minimizing the size of the set of candidate target words by processing at least one additional character that follows the first segment and is received from the user.

14. The method of claim 6, further comprising: processing the set of input characters using at least one pre-defined library of input sequences mapped to respective target words; and enabling a user to select a pre-defined library to be mapped to a particular application for processing of input characters associated with the application.

15. The method of claim 6, wherein the input characters selected from said consonants in the target word include a last letter of at least one syllable that ends with a consonant.

* * * * *